3 Sheets--Sheet 2.
J. MACKAY.
Mills for Grinding Barley.
No. 136,527. Patented March 4, 1873.
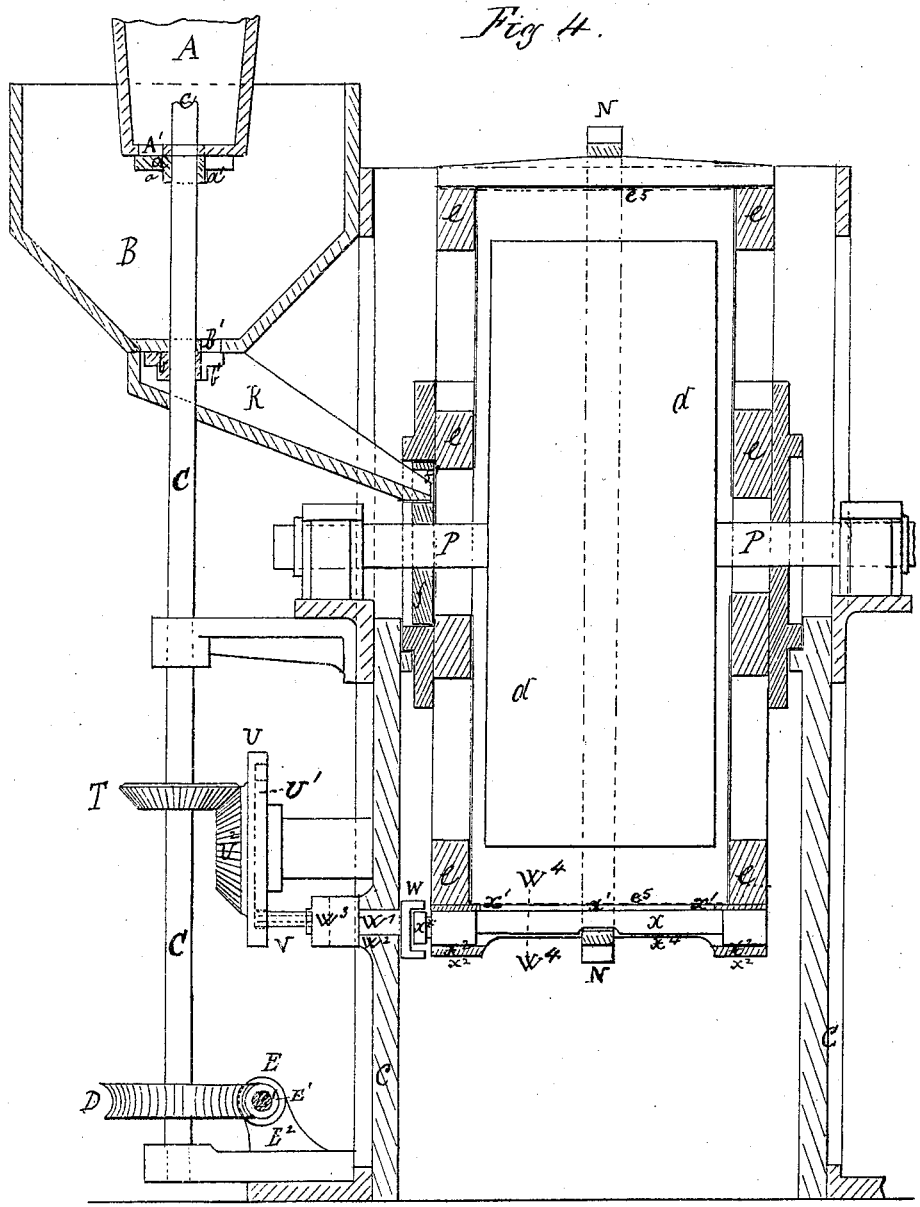

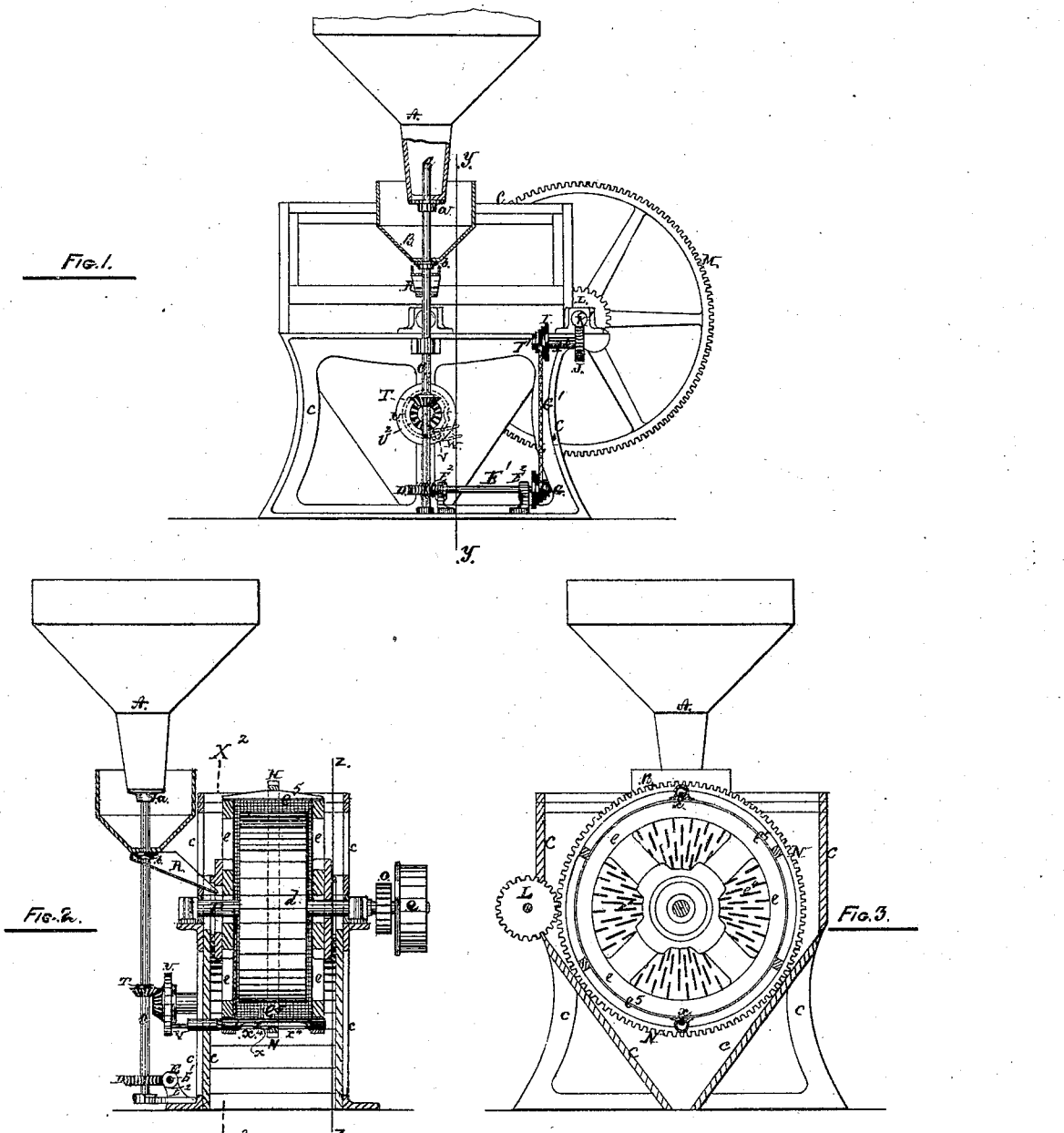

3 Sheets--Sheet 3.
J. MACKAY.
Mills for Grinding Barley.
No. 136,527. Patented March 4, 1873.
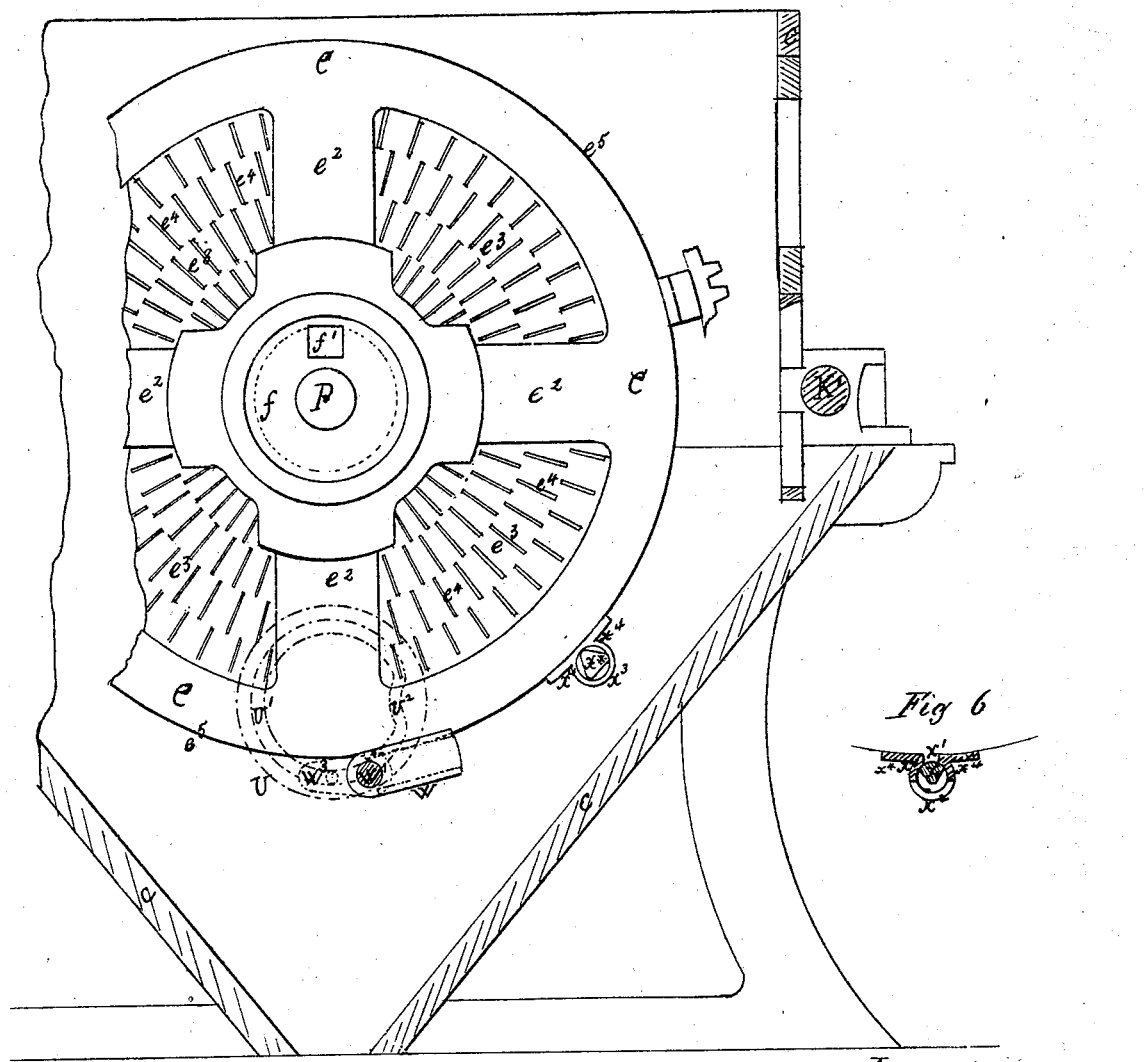
Witnesses
J. Mason Bogzler
A. P. Lacey
Inventor
John MacKay
by Colburn Brookes & Co.
his Attorneys

UNITED STATES PATENT OFFICE.

JOHN MACKAY, OF DUNDAS, CANADA.

IMPROVEMENT IN MILLS FOR GRINDING BARLEY.

Specification forming part of Letters Patent No. 136,527, dated March 4, 1873.

*To all whom it may concern:*

Be it known that I, JOHN MACKAY, of Dundas, in the county of Wentworth and Province of Ontario, Canada, have invented certain Improvements in Barley-Mills, of which the following is a specification:

The object of my invention is to so construct a barley-mill that the grain may be automatically fed to the apparatus and ground, and after such grain is ground to the desired fineness it may be automatically discharged from the apparatus without requiring further attention than is ordinarily given to mill-gearing.

Before describing my improved mill in detail, I would remark that in barley-mills, unlike flour-mills, it is essential that the grain should be fed to the apparatus at intervals, varying according to the kind of barley being ground, and the barley is retained a greater or less time in contact with the stone, according to the degree of fineness to which it is to be reduced. For instance, when it is to be reduced very fine the barley is allowed to remain a longer time under operation, but when the result desired is to be coarse the barley is retained but a short time in the apparatus.

But that my invention may be fully understood, I will proceed to describe the same by aid of the accompanying drawing.

Description of the Drawing.

Figure 1 is a side elevation, partly in section. Fig. 2 is a transverse section taken through the line $yy$ of Fig. 1. Fig. 3 is a sectional side view taken through the line $zz$ of Fig. 2. Fig. 4 is a transverse section on a larger scale of some of the parts shown by Fig. 2. Fig. 5 is a sectional side view, also on a larger scale, taken through the lines $x^2 x^2$ of Fig. 2. Fig. 6 is a sectional view of one of the discharging-valves $x$ taken through the line $W^4 W^4$ of Fig. 4.

Similar letters of reference are employed to indicate corresponding parts wherever they occur.

$c$ is the main framing. P is the main or driving axis, upon which is keyed the drum or pulley Q, which receives motion by means of a strap or band from a steam-engine or other suitable motive power. $d$ is the grinding-stone, which is firmly affixed to and revolves with the main shaft P and within the casing $e$, which is caused to revolve on but independently of the axle P by means of a spur-ring, N, affixed on its periphery, and to which motion is communicated by a spur-wheel, L, affixed to the shaft K', receiving motion by means of the large spur-wheel M, driven by a spur-wheel, O, keyed to the main axis P. A is the main hopper or supply-chamber, from which the barley is allowed to pass in regulated quantities and at stated intervals through the hole or aperture A' into a second hopper, B, by means of a valve, $a$, rotating with the shaft C, which is provided with an opening, $a'$, corresponding with the opening A' in the bottom of the main or supply hopper A. $b$ is a similar valve to valve $a$, provided with a passage, $b'$, arranged at the under side of the hopper B to regulate the opening or closing of the aperture B' in the bottom of the hopper B. R is a spout or chute whereby the barley, after passing from the hopper B, is conducted to the interior of the stone-case $e$ to be ground by the stone $d$. $f$ is a stationary circular disk or plate, provided with an aperture, $f'$, for the reception of the end of the spout or chute R. This circular disk is so arranged that the axle P shall revolve within it freely, and at the same time it affords no impediment to the motion of the case $e$.

Motion is communicated to the valves $a$ and $b$ to regulate the feed of the barley to the apparatus by means of the upright shaft C, which receives motion by means of the spur-wheel D from a worm, E, affixed on one end of a shaft, E$^1$, (revolving in bearings E$^2$ E$^2$,) to the other end of which is keyed a differential pulley, G, receiving motion by means of a strap or band, G', from a similar differential pulley, I, affixed to one end of a shaft, I$^1$, revolving in bearings I$^2$, and receiving motion by means of a spur-wheel, J, to which motion is communicated by the screw K, keyed on the shaft or axis K'.

The aperture A' in the bottom of the hopper A is at right angles to the aperture B' in the bottom of the hopper B, while the passage $a'$ in the valve $a$ is placed vertically over the passage $b'$ in the valve $b$, the object of which is that the passage-ways $a'$ and $b'$ shall be alternately closed and opened at different times—that is to say, that immediately the one passage commences to be opened the other is just completely closed. $x\ x$ are valves for the discharge of the ground barley from the apparatus through the apertures $x'$ in the periphery of the casing $e$ for the stone $d$. These valves $x$ are caused to oscillate or make partial revolutions when desired to open the valve-passage $x^1$ by means of a shoe W, which at certain intervals comes into position, as hereafter more fully described, to turn the said valve by coming in contact with the projecting ends $x^*$ of the discharging-valves $x$. The valve $x$ at each end turns in bearings $x^2$ in the valve-casing $x^3$. $x^4$ is an opening in the valve-casing for the free passage of the ground barley. In the revolution of the various parts, so long as the pin or stud V works in the circular portion of the cam-course $U^1$, the shoe W is held in such a position that the projecting ends of the discharging-valves will pass through the groove in the shoe without being moved; but when the pin or stud V gets into the jog $U^2$ of the cam-course $U^1$, the angle of the shoe W is altered so that it shall come in contact with the projecting ends $x^2$ of the valves $x$, whereby such valves $x$ will be opened for the purpose of discharging the ground barley while their projecting ends $x^2$ are passing through the shoe W. The shoe W is affixed to one end of an axis, $W^1$, (supported in bearings $W^2$ in the main framing C,) to the other end of which a lever-arm, $W^3$, is affixed, which supports and carries a stud or pin, V, working in a cam-course, $U^1$, formed in the surface of the disk or plate U, which receives motion by means of the bevel-wheel $U^2$, which gears into a corresponding wheel, T, affixed on the shaft or axis C.

In order that the working of the various parts of the apparatus may be clearly understood by any competent mechanic, I will suppose that the main or supply hopper A is filled with barley, and that the valve $a$ has just allowed a given quantity of barley to pass through the passage $a'$ into the hopper B, and that the valve $b$ is in the position shown in Fig. 4, with the passage-way $b'$ open, and allowing the barley contained in the hopper B to pass down the spout or chute R into the casing $e$, where it remains a sufficient time to be properly ground; it is then discharged by the openings $x^1$ of the valves $x$, and a fresh supply admitted, and so on continuously. The barley may be fed to and discharge itself from the apparatus either faster or slower, at will, by shifting the belt $G'$ connecting the pulleys G and I; they will, however, always retain their same relative motion. The case $e$ is provided at $e^1$, between the supporting-arms $e^2$, with metallic plates $e^3$, in which indented perforations $e^4$ are formed. The periphery $e^5$ of the case $e$, between the valves $x$, is formed reticulate, and by preference of wire-work. The barley is ground by being retained between the sides and outer periphery of the case $e$ and the surface of the revolving stone $d$.

Having thus described my invention, I would have it understood that what I claim, and desire to secure by Letters Patent, is—

1. In a barley-mill, an automatic feeding-valve, $b$, having a passage, $b'$, arranged upon a rotating shaft, C, operating in connection with a hopper, B, having a passage, $B'$, for the purpose described.

2. The discharging-valve $x$, constructed and arranged on the casing $e$, and operating substantially as described.

3. The combination of the discharging-valve $x$, shoe W, crank-pin V, lever $W^3$, cam-plate U, bevel-pinions $U^2$, and bevel-wheel T on the upright shaft C, substantially as and for the purposes described and set forth.

4. In a barley-mill, the combination of the pinion O, large spur-wheel M, pinion L, and spur-ring N, arranged for the purpose of driving the casing $e$, substantially as shown and described.

5. In a barley-mill, the combination of the valves $a$ and $b$ having passages $a'\ b'$, and arranged on and rotating with the shaft C, in combination with hoppers A and B having passages $A'$ and $B'$, substantially as and for the purposes described and set forth.

Toronto, July 18, 1872.

JOHN MACKAY.

Witnesses:
 DONALD C. RIDOUT,
 J. HERBERT BARTLETT.